United States Patent [19]

Deisch

[11] 4,148,097
[45] Apr. 3, 1979

[54] DC TO DC CONVERTER UTILIZING CURRENT CONTROL FOR VOLTAGE REGULATION

[75] Inventor: Cecil W. Deisch, Wheaton, Ill.

[73] Assignee: Bell Telephone Laboratories, Incorporated, Murray Hill, N.J.

[21] Appl. No.: 812,318

[22] Filed: Jul. 1, 1977

[51] Int. Cl.² .................... H02M 3/335; H02M 7/537
[52] U.S. Cl. ......................................... 363/26; 363/49; 363/134
[58] Field of Search ..................... 363/23, 24, 25, 79, 363/80, 96, 97, 49, 26, 133, 134

[56] References Cited

U.S. PATENT DOCUMENTS

| | | | |
|---|---|---|---|
| 3,859,583 | 1/1975 | Reed | 363/26 |
| 3,879,647 | 4/1975 | Hamilton et al. | 363/49 X |
| 3,909,695 | 9/1975 | Peck | 363/25 |
| 4,002,963 | 1/1977 | Hunter | 363/80 |
| 4,032,830 | 6/1977 | Bounavita | 363/25 |

Primary Examiner—J. D. Miller
Assistant Examiner—Peter S. Wong
Attorney, Agent, or Firm—Peter Visserman; Richard C. Stevens

[57] ABSTRACT

A DC to DC converter is disclosed wherein the output voltage is regulated by the control of current pulses in an inverter stage. The converter output voltage and a defined reference voltage are compared to generate error signals and current flow in the inverter stage is monitored to generate proportional current signals. The error signals are directly compared to the current signals by a comparing circuit which comprises a voltage amplifier and a current source. The error signals are coupled to the voltage amplifier which maintains a corresponding voltage on one side of a resistor. The current signals are coupled to the current source which is connected to the other side of the resistor and maintains the current flow through the resistor at a level equal to the current signals. Current pulses in the inverter stage are initiated by pulses from a pulse generator circuit and terminated when the current signals exceed a current threshold level which is defined as the voltage maintained on the resistor divided by the resistance value of the resistor.

12 Claims, 3 Drawing Figures

DC TO DC CONVERTER UTILIZING CURRENT CONTROL FOR VOLTAGE REGULATION

FIELD OF THE INVENTION

My invention relates to DC to DC switching converters and more particularly to a pulse width control arrangement for DC to DC switching converters.

BACKGROUND OF THE INVENTION

Several inherent problems in DC to DC switching converters are solved by controlling current flow in the converter to regulate output voltage. These problems include: protection of circuit components from overloads and short circuits on the converter output; maintaining current balance between alternately activated devices which convert a direct current input to an alternating current output; and the parallel connection of several converters to supply high power to a common load.

U.S. Pat. No. 4,002,963 discloses an arrangement wherein current pulses in an inverter stage are monitored and a proportional current signal is fed back, electronically transformed, integrated, and compared to a reference voltage such that when the integrated signal exceeds the reference voltage, the current pulses are terminated. However, this arrangement introduces unnecessary delay in the feedback control through the integration of the feedback current.

SUMMARY OF THE INVENTION

In accordance with my invention, voltage regulation in a DC to DC converter is controlled by directly comparing current feedback signals from an inverter stage to a current threshold level. The output of the inverter stage is rectified and filtered and the resulting DC output voltage is compared to a reference voltage to generate error signals. These error signals drive a voltage amplifier which sets the current threshold level. Current in the inverter stage is transformer coupled to set a current level in a current source which is connected to the voltage amplifier for direct comparison of the current feedback signals to the current threshold level. When the current level in the current source exceeds the current threshold level, the current pulse in the inverter stage is terminated.

Instability is a common problem in circuits utilizing feedback control and, particularly for large duty cycles, switching converter circuits may become unstable. However, the stability of the converter circuit of my invention may be ensured by using an inverter transformer having a low magnetizing inductance or by adding a stabilizing circuit which comprises an approximately linear current ramp generator whose output is added to the feedback current signals from the inverter stage.

Another common problem in switching converters is input current surge when the converter is started due to saturation of the inverter transformer. In my invention, transformer saturation upon startup is prevented by limiting the first inverter current pulse to one-half of the normal maximum pulse width. The converter includes a pulse generator wherein two comparators are referred to two different reference voltages but monitor the voltage on a single capacitor. The two comparators drive a single flip-flop which controls the alternate charging and discharging of the capacitor. The pulse width of the initial pulse upon startup is halved by controlling the two reference voltages such that the voltage on the capacitor approximately equals the higher reference voltage after a time which is equal to one-half the normal maximum pulse width, at which time the initial pulse is terminated.

Advantageously, a DC to DC converter in accordance with my invention provides more rapid feedback response than prior art converters. The improved feedback response ensures low magnetizing current in the inverter transformer which allows the use of a smaller transformer and lower voltage rated switching transistors.

BRIEF DESCRIPTION OF THE DRAWING

The invention will be better understood from the following detailed description when read with reference to the drawing in which.

DETAILED DESCRIPTION

Figure 1:
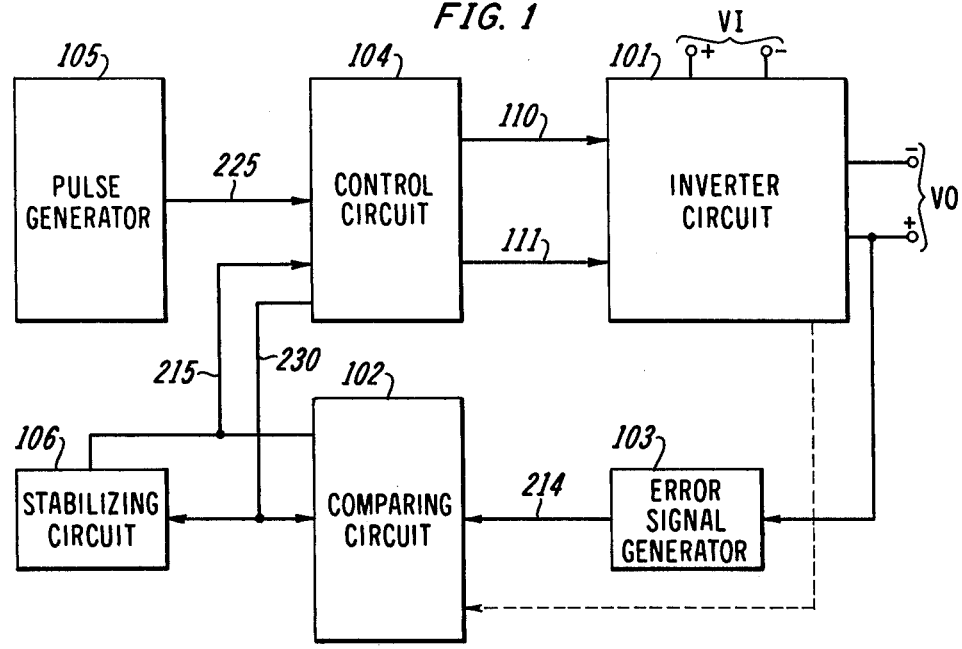
FIG. 1 is a block diagram of a DC to DC switching converter in accordance with my invention.
Figure 3:
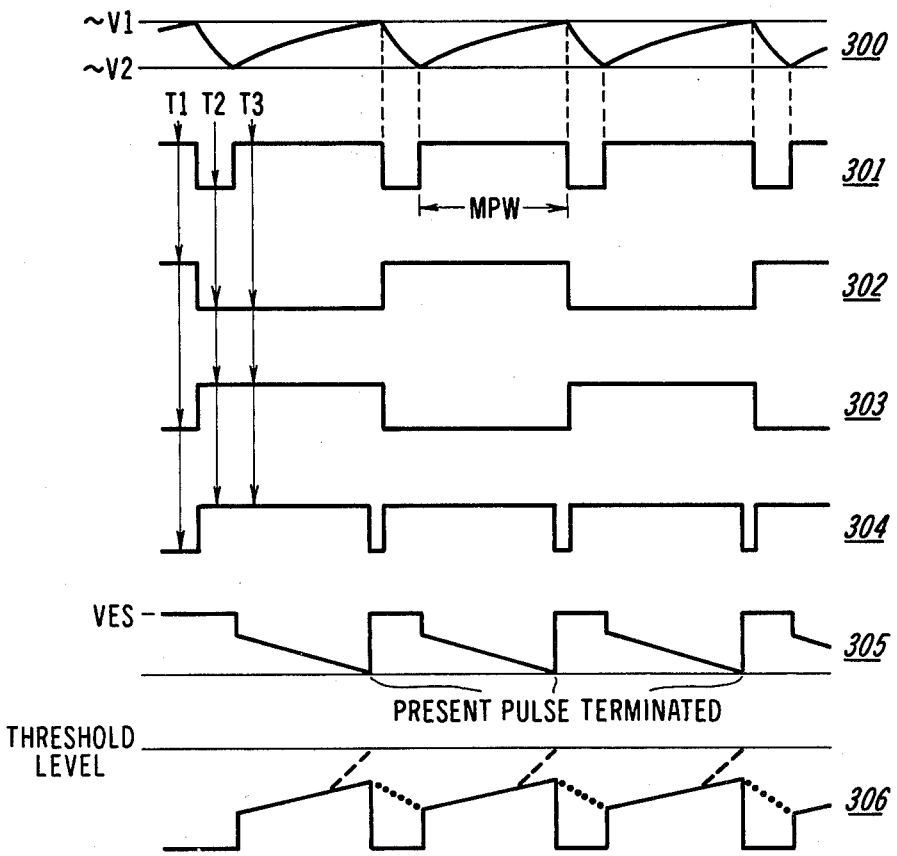
FIG. 3 is a timing diagram showing various signal waveforms within the converter.
Figure 2:
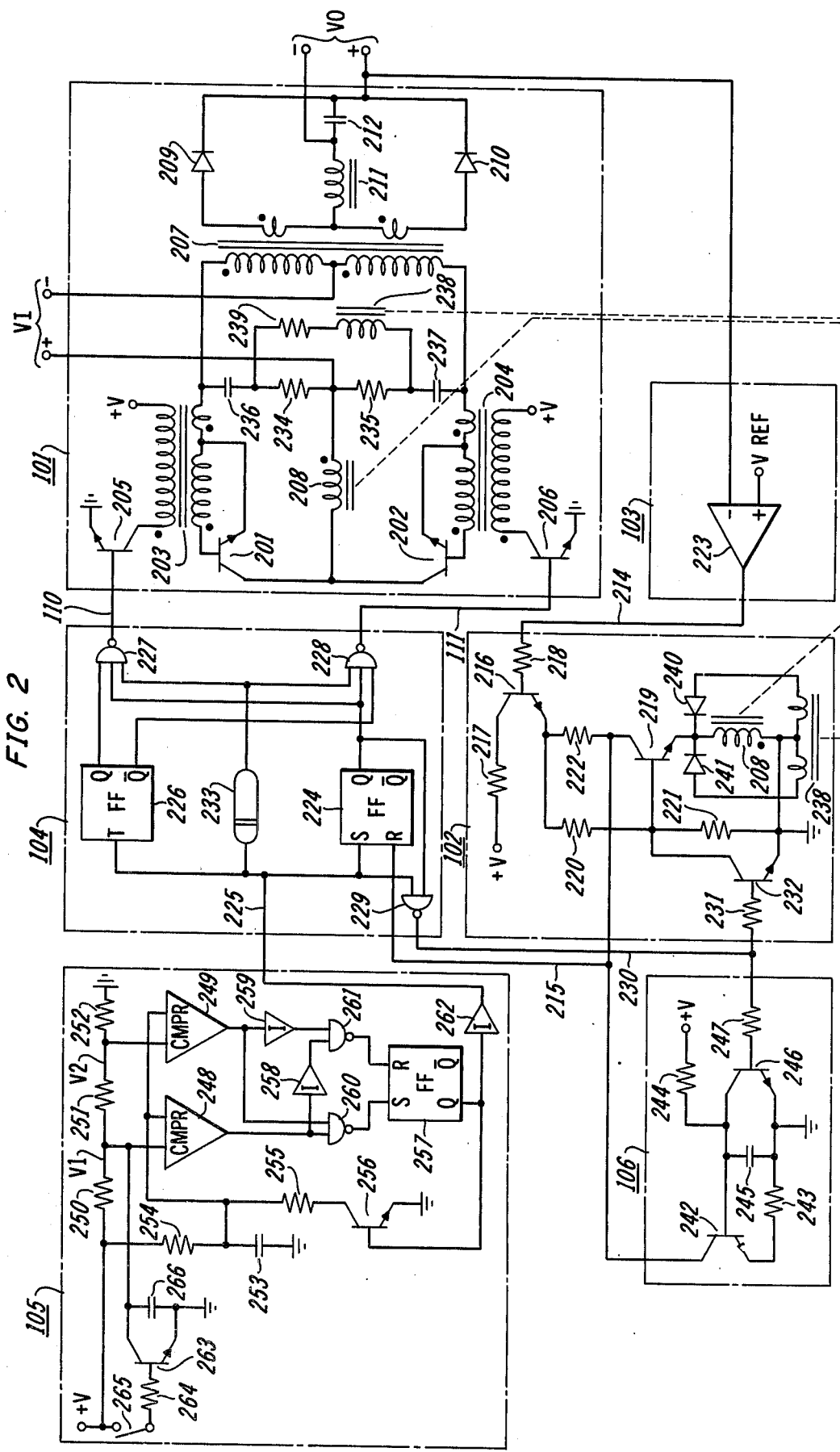
FIG. 2 is a schematic diagram showing the circuit details of the individual blocks of FIG. 1.

The operation of the circuit will be first described generally with reference to FIG. 1, and in greater detail with reference to FIGS. 2 and 3 in subsequent paragraphs. The output voltage VO of the converter of FIG. 1 is regulated by controlling current pulses in the inverter circuit 101. The inverter circuit 101 comprises an output transformer in which current flow is controlled by means of a pair of switching transistors which are alternately activated and deactivated under the control of signal pulses generated in the control circuit 104 and transmitted on the conductors 110 and 111. The control circuit 104 receives a continuous sequence of periodic pulses from the pulse generator 105 over the conductor 225 and feedback control signals from the comparing circuit 102 over the conductor 215. Current signals directly proportional to current pulses in the inverter circuit 101 are transformer coupled to the comparing circuit 102, where they set the current level of a current source circuit internal to the comparing circuit 102. The error signal generator 103 monitors the output voltage VO and compares that output voltage to a reference voltage to generate error signals which are transmitted to the comparing circuit 102. In the comparing circuit 102, the error signals drive a voltage amplifier to establish a current threshold level to which the current level of the current source is compared. When the current level of the current source exceeds the threshold level established by the voltage amplifier, a pulse termination signal is generated in the comparing circuit 102 and is transmitted to the control circuit 104 over the conductor 215. Once activated, a switching transistor in the inverter circuit 101 remains active until the activating signal from the control circuit 104 is terminated. Such termination will occur in response to a change of state of the input pulse on conductor 225 or when the comparing circuit 102 generates a pulse termination signal, the latter being the normal case. The stabilizing circuit 106 may be required for large duty cycle operation and, if provided, generates an approximately linear current ramp which is essentially added to the current signals from the inverter circuit 101.

Referring to FIGS. 2 and 3, overall circuit operation is as follows. The inverter circuit 101 produces an alternating current (AC) signal from the input direct current (DC) supply voltage VI. This AC signal is transformer coupled to a rectifier circuit the output from which is filtered to produce the desired DC output voltage VO. The inverter circuit 101, which is well known in the art, comprises the switching transistors 201 and 202, the driver transformers 203 and 204, the control transistors 205 and 206, and the inverter transformer 207. The switching transistors 201 and 202 have their collector terminals connected together and connected to the high potential side of the input DC supply voltage VI through the primary winding of the current monitoring transformer 208 which monitors current flow in the primary winding of the inverter transformer 207. The two circuit loops of the primary side of the inverter circuit are completed by connecting the center tap of the primary winding of the inverter transformer 207 to the low potential side of the input DC supply voltage VI. Signals from the control circuit 104 alternately activate the transistors 201 and 202 through the transistors 205 and 206, and the driver transformers 203 and 204. It is known in the art that if the driver transformers are poled as indicated in FIG. 2 and current flows in the control transistors and driver transformer primaries, that the switching transistors are turned off. If a control transistor is turned off, the abrupt interruption of current flow in the primary of the associated driver transformer provides a pulse of base current to its associated switching transistor. That switching transistor is turned on and is maintained in its on state by base current feedback through the driver transformer. The alternate activation of the switching transistors 201 and 202 produces an alternating current signal at the secondary of the inverter transformer 207. This alternating current signal is fullwave rectified by the diodes 209 and 210 and filtered by the inductor 211 and the capacitor 212 to provide the DC output voltage VO.

The control circuit 104 generates signals to alternately activate and deactivate the inverter switching transistors 201 and 202 to set the pulse widths of current pulses in the primary winding of the inverter transformer 207 in order to maintain a defined output voltage level. The control circuit 104 receives periodic pulses, represented by the waveform 301 shown in FIG. 3, from the pulse generator 105 over the conductor 225 and receives pulse termination signals, represented by the waveform 305 shown in FIG. 3, from the comparing circuit 102 over the conductor 215. The comparing circuit 102 and the generation of the pulse termination signals will be described hereinafter.

The components and the detailed operation of the control circuit 104 are as follows. The toggle flip-flop 226 alternately enables the NAND gates 227 and 228 to allow consecutive pulses from the pulse generator 105 to alternately activate the switching transistors 201 and 202. The Q output (the normal output), represented by the waveform 302, of the toggle flip-flop 226 is connected to the NAND gate 227 while the $\overline{Q}$ output (the inverted output), represented by the waveform 303, of the toggle flip-flop 226 is connected to the NAND gate 228. The toggle flip-flop 226 alternates between its set state ($Q = 1$, $\overline{Q} = 0$) and its reset state ($Q = 0$, $\overline{Q} = 1$) for consecutive high to low transitions of the waveform 301 on its toggle input T.

The set/reset flip-flop 224 receives pulse termination signals from the comparing circuit 102 and in response thereto turns off the switching transistors 201 and 202. The Q output (the normal output), represented by the waveform 304, of the set/reset flip-flop 224 is connected to inputs of the NAND gates 227, 228, and 229. The set/reset flip-flop 224 is placed into its set state ($Q = 1$, $\overline{Q} = 0$) if the input signal to the set lead S is low and the input signal to the reset lead R is high; conversely, the set/reset flip-flop 224 is placed into its reset state ($Q = 0$, $\overline{Q} = 1$) if the input signal to the reset lead R is low and the input signal to the set lead S is high. The NAND gate 229 deactivates the comparing circuit 102 whenever both the switching transistors 201 and 202 are deactivated, by clamping the base of the current source circuit transistor 219 to ground via the conductor 230, the base resistor 231, and the transistor 232. The comparing circuit 102 is deactivated to ensure that the signal on the conductor 215 is high such that the set/reset flip-flop 224 may be properly set by a low signal from the pulse generator 105. The delay element 233 ensures that the comparing circuit 202 is activated by removal of the clamp from the base of the transistor 219 before either transistor 201 or 202 is activated.

At time T1 shown in FIG. 3, the toggle flip-flop 226 is in its set state (see 302 and 303), the set/reset flip-flop 224 is in its reset state (see 304), and the waveform 301 from the pulse generator 105 is high immediately preceding a transition to low. At time T1, the output signal of the NAND gate 227 is high which activates the transistor 205 which in turn ensures that the transistor 201 is turned off as previously described. The output signal of the NAND gate 228 is also high which similarly ensures that the transistor 202 is turned off. The output signal of the NAND gate 229 is also high which activates the clamping transistor 232 to deactivate the comparing circuit 102. At time T2 shown in FIG. 3, the output signal from the pulse generator 105, represented by the waveform 301, has changed from high to low which resets the toggle flip-flop 226 (see 302 and 303) and sets the set/reset flip-flop 224 (see 304). A low signal on the Q output of the toggle flip-flop 226 disables the NAND gate 227 while a high signal on the $\overline{Q}$ output of the toggle flip-flop 226 in combination with a high signal on the Q output of the set/reset flip-flop 224 enables the NAND gate 228 in anticipation of the positive portion of the output signal from the pulse generator 105, represented by the waveform 301. The high signal on the Q output of the set/reset flip-flop 224 also enables the NAND gate 229. At time T3 shown in FIG. 3, the output signal from the pulse generator 105, represented by the waveform 301, has changed from low to high which forces the output of the NAND gate 229 low which removes the clamp from the transistor 219 and activates the comparing circuit 102.

The delay element 233 delays the high signal from the pulse generator 105 until after the comparing circuit 102 is activated; after this delay, a positive signal is provided to the NAND gates 227 and 228 which forces the output signal of the NAND gate 228 to go low turning off the transistor 206 which turns on the transistor 202 as previously described. The current flowing in the transistor 202 also flows through the primary of the current monitoring transformer 208 and proportional current signals, represented by the waveform 306, are generated in the secondary winding of the current monitoring transformer 208 which is connected to the comparing circuit 102. In response to the current signals generated in the secondary winding of the current monitoring transformer 208, the comparing circuit 102 generates pulse termination signals, represented by the waveform 305, which reset the set/reset flip-flop 224 over the conductor 215. Resetting the set/reset flip-flop 224 provides a low signal to the NAND gates 227 and 228. A low signal to the NAND gate 228 forces the signal on its output high which turns on the transistor 206. A low signal to the NAND gate 227 ensures that the signal on its output remains high, which maintains the transistor 205 in its on state. With the transistor 206 turned on, transformer action of the driver transformer 204 removes the base drive from the transistor 202 thus turning it off. Under normal circuit operation, these actions occur before the signal from the pulse generator 105, represented by the waveform 301, transitions from its high state to its low state. However, the low signal from the pulse generator 105 turns off transistor 202 in any event over its connection to inputs of the NAND gates 227 and 228 through the delay element 233.

On the next high to low transition of the signal from the pulse generator 105, the toggle flip-flop 226 is set which enables the NAND gate 227, disables the NAND gate 228, forces the output of the NAND gate 229 high, and sets the set/reset flip-flop 224. The same operating sequence occurs when the signal from the pulse generator 105 again transitions from low to high; however, with the toggle flip-flop 226 set, the transistor 201 is turned on and off while the transistor 202 remains off.

The comparator 223 of the error signal generator 103 compares the output voltage VO to the reference voltage VREF to generate error signals indicative of the relative difference between the output voltage and the reference voltage. These error signals are provided to the comparing circuit 102 over the conductor 214.

The comparing circuit 102 includes a voltage amplifier which comprises the transistor 216 and the resistors 217 and 218. The voltage amplifier is responsive to the error signals generated by the comparator 223 to maintain the voltage on the emitter of the transistor 216 substantially equal to the error signals. The comparing circuit 102 further includes a current source comprising the transistor 219, the secondary of the current monitoring transformer 208 connected as an emitter load of the transistor 219, and the biasing resistors 220 and 221 which bias the transistor 219 into its active region. The biasing resistors 220 and 221 receive power from the output of the voltage amplifier to vary the biasing voltage of the transistor 219 for circuit operation over a wide range of converter output currents. The resistor 222 couples the voltage amplifier to the current source by connecting the emitter of the transistor 216 to the collector of the transistor 219. This arrangement allows direct comparison of the current signals from the inverter circuit 101 to the error signals from the error signal generator 103. The voltage at the emitter of the voltage amplifier transistor 216 is substantially equal to the voltage of the error signals, which will be referred to herein as VES , while the current which flows through the resistor 222 is equal to the current level of the current source, which will be referred to herein as ICS. Accordingly, the voltage on the conductor 215 (ignoring the effect of the stabilizing circuit 106 whose operation will be described hereinafter) is approximately equal to VES minus the product of ICS and the resistance X of the resistor 222. Pulse termination signals are defined by the voltage on the conductor 215 going to the voltage which defines the low logic level for the set/reset flip-flop 224. For example, if the low level logic voltage is equal to zero, pulse termination signals are generated if the current level ICS of the current source reaches a value which when multiplied by X is equal to VES. Waveform 305 in FIG. 3 represents the voltage on the conductor 215 and shows the pulse termination signals. If the voltage on the conductor 215 reaches the low logic level voltage, the set/reset flip-flop 224 of the control circuit 104 is reset which terminates the current pulse in the primary winding of the inverter transformer 207 as previously described.

The pulse generator 105 can be constructed from commercially available integrated circuits (e.g., the SIGNETICS 555 timer). The pulse generator 105 comprises the comparators 248 and 249 which are respectively referenced to the reference voltages V1 and V2. The reference voltages are generated by the voltage divider network comprising the resistors 250, 251, and 252, which is connected across the auxiliary source of DC potential +V. The inputs of both the comparators 248 and 249 are connected to the capacitor 253 which is charged through the resistor 254 and discharged through the resistor 255 and the transistor 256. The transistor 256 is controlled by the set/reset flip-flop 257 such that the transistor 256 is turned on and the capacitor 253 is discharged when the flip-flop 257 is set; and the transistor 256 is turned off and the capacitor 253 is allowed to charge when the flip-flop 257 is reset. If the voltage on the capacitor 253 is slightly greater than the reference voltage V1, the signals on the outputs of the comparators 248 and 249 are high and the gating circuitry comprising the inverters 258 and 259 and the NAND gates 260 and 261 forces the set/reset flip-flop 257 into its set state. Accordingly, the capacitor 253 is discharged through the resistor 255 and the transistor 256. As the voltage on the capacitor 253 decreases due to this discharge, it goes slightly below the reference voltage V2; this causes the signals on the outputs of the comparators 248 and 249 to go low which, through the gating circuitry, forces the flip-flop 257 to be reset. While the set/reset flip-flop 257 is in its reset state, the transistor 256 is turned off and the capacitor 253 charges through the resistor 254. The voltage on the capacitor 253 thus oscillates between two voltage levels, the one approximately equal to V1 and the other approximately equal to V2, as represented by the waveform 300. The timing of the periodic signal appearing on the conductor 225 is determined by selecting the resistance values of the resistors 254 and 255 and the capacitance value of the capacitor 253. The inverter circuit 262 serves to buffer the output of the flip-flop 257 and to provide a properly phased output to the control circuit 104.

When the converter is turned on it is possible to encounter large input current surges due to saturation of the inverter transformer 207. These current surges can cause damage to converter components, particularly, the transistors 201 and 202 and can also cause line voltage transients which affect other equipment powered by the same input DC supply voltage VI. This problem is overcome in accordance with this invention by the start-up arrangement comprising the capacitor 266, the transistor 263, and the resistor 264. This arrangement ensures that the initial current pulse in the inverter circuit 101 is no greater than one-half the normal maximum pulse width MPW, as represented in the waveform 301 of FIG. 3.

To turn off the converter, the switch 265 is closed which activates the transistor 263 to reduce the reference voltages V1 and V2 to approximately zero potential. The voltage on the capacitor 253 is then greater than the reference voltages and the set/reset flip-flop 257 is set as previously described. With the set/reset flip-flop 257 in its set state, the transistor 256 is turned on and the voltage on the capacitor 253 will stabilize at the voltage determined by the voltage divider comprising the resistors 254 and 255. This stabilized voltage is greater than zero potential and, therefore, the pulse generator is in a stable state and will no longer oscillate. To turn on the converter, the switch 265 is opened which turns off the transistor 263 and allows the capacitor 266 to begin charging through the resistor 250. The voltage on the capacitor 266 increases until the reference voltage V2 is slightly greater than the stabilized voltage on the capacitor 253. At that point, the set/reset flip-flop 257 is reset turning off the transistor 256 and allowing the capacitor 253 to charge through the resistor 254. The capacitance value of the capacitor 266 is selected such that the voltage on the capacitor 266, and consequently the reference voltage V1, is slightly less than the voltage on the capacitor 253 after a period of time has elapsed which is equal to one-half the normal maximum pulse width MPW of current pulses in the inverter circuit 101. At that point, the flip-flop 257 is set turning on the transistor 256 to discharge the capacitor 253 through the resistor 255. Accordingly, the initial pulse in the inverter circuit 101 is approximately equal to one-half the normal maximum pulse width MPW which ensures that the inverter transformer 207 will not saturate. The second and following pulses in the inverter circuit 101 can be equal to the normal maximum pulse width MPW without saturating the inverter transformer 207.

A common problem encountered in DC to DC switching converters is the noise generated by current switching in the inverter stage. Of several available noise suppression techniques, the embodiment of FIG. 2 utilizes resistor and capacitor networks comprising the resistors 234 and 235 and the capacitors 236 and 237. However, current flow through these noise suppression networks may be coupled into the comparing circuit 102 through the current monitoring transformer 208 and can generate false pulse termination signals. To counteract this noise current, the transformer 238, the resistor 239, and the diodes 240 and 241 are added to the circuit. The sum of the voltage across the resistors 234 and 235 is indicative of the current flow through the noise suppression networks. This sum voltage is impressed across the series combination of the primary winding of the transformer 238 and the resistor 239 to generate a current flow therein. This current flow generates a corresponding current flow in the center tapped secondary winding of the transformer 238. The center tap of the secondary winding of the transformer 238 is connected to one side of the secondary winding of the current monitoring transformer 208 while the ends of the secondary winding of the transformer 238 are connected to the other end of the secondary winding of the current monitoring transformer 208 through the diodes 240 and 241. The current which is generated in the secondary winding of the transformer 238 is approximately equal to the noise current which is generated in the secondary winding of the current monitoring transformer 208 and the diodes 240 and 241 are poled so that the noise current is approximately canceled to prevent the generation of false pulse termination signals.

If instability occurs for large duty cycle operation, the stabilizing circuit 106 may be added to the converter circuit to ensure stable operation. The stabilizing circuit 106 is a current ramp generator comprising the transistor 242, the resistors 243 and 244, and the capacitor 245. The transistor 246 together with the base resistor 247 serves to clamp the capacitor 245 during periods when both the switching transistors 201 and 202 are turned off. Due to this current clamping arrangement, each current ramp starts from zero. If either of the switching transistors 201 and 202 is turned on, the transistor 246 is turned off which allows the capacitor 245 to charge through the resistor 244. The voltage on the capacitor 245 reaches the base-emitter threshold voltage of the transistor 242 after an elapsed charging time which is equal to approximately one-half MPW. At that time the transistor 242 is turned on and a current ramp, regulated by the resistor 243, is generated. The current ramps are effectively added to the current source of the comparing circuit 102 via the conductor 215 to increase the current flow through the resistor 222. This increased current flow, the effect of which is represented by the dashed lines in the waveform 306, ensures stability by shaping the proportional feedback current signals from the inverter circuit 101. These feedback current signals are shaped such that their effective increasing slope in the comparing circuit 102 during the on time of the transistors 201 and 202 is greater than the decreasing slope of the current signals in the filter inductor 211 as modified by the turns ratios of the transformers 207 and 208 during the off time of the transistors 201 and 202. Although no current flows in the transformer 208 during the off time of the transistors 201 and 202, the dotted line in the waveform 306 represents the declining current in the inductor 211 and indicates the slope of interest for stability purposes. It can be shown by mathematical analysis that if the effective slope of the current signals fed back to the comparing circuit during the on time of the transistors 201 and 202 is greater than or equal to the slope of the declining current in the inductor 211 as modified by the turns ratios of the transformers 207 and 208 during the off time of the transistors 201 and 202, that any disruption in the current flow in the inverter circuit 101 will be damped out to maintain stable operation.

It is to be understood that the above-described embodiment is merely illustrative of the principles of my invention; other arrangements may be devised by those skilled in the art without departing from the spirit and scope of the invention. For example, the roles of the current and voltage could be interchanged through well-known current and voltage analogs resulting in a voltage controlled current source.

What is claimed is:
1. A DC to DC converter comprising:
an inverter circuit comprising two circuit loops connected to a source of DC potential, each circuit loop comprising a switching device and one-half of a center tapped primary winding of an inverter transformer having the center tap thereof connected to said source of DC potential, both circuit loops being completed by connecting the switching devices to said source of DC potential through a common path;
an output circuit comprising a rectifier circuit and a filter circuit connected to a center tapped secondary winding of said inverter transformer such that a DC output voltage is derived;
error signal generating means coupled to monitor said DC output voltage and comprising means for comparing said DC output voltage to a reference voltage and for generating error signals in accordance with the comparisons;

pulse generating means for generating a sequence of periodic pulses;

a current monitoring transformer comprising a primary winding and a secondary winding;

said common path comprising the primary winding of said current monitoring transformer which generates in the secondary winding thereof current signals directly proportional to current flowing in said inverter circuit;

comparing means for directly comparing said current signals to said error signals and for generating pulse termination signals when said current signals exceed a threshold level determined by said error signals; and control means connected to said pulse generating means, to said comparing means, and to said inverter circuit for controlling said switching devices such that said switching devices are alternately activated by consecutive pulses from said pulse generating means and deactivated by said pulse termination signals for causing pulses of current flow in the primary winding of said inverter transformer.

2. A DC to DC converter in accordance with claim 1 further comprising:

stabilizing means connected to said comparing means for effectively increasing said current signals within said comparing means by a linearly increasing current ramp during active periods of said switching devices; and said control means further comprising means for initializing said stabilizing means and said comparing means during inactive periods of said switching devices.

3. A DC to DC converter in accordance with claim 1 wherein said comparing means comprises:

a resistance element having first and second terminals;

a voltage amplifier coupled to the first terminal of said resistance element and to said error signal generating means for receiving said error signals and for maintaining a voltage corresponding to said error signals on said first terminal; and a current source coupled to said current monitoring transformer and to the second terminal of said resistance element for maintaining the current flow through said resistance element substantially equal to said current signals.

4. A DC to DC converter in accordance with claim 3 further comprising:

stabilizing means connected to the second terminal of said resistance element for generating a linearly increasing current ramp and for adding said current ramp to the current flow through said resistance element; and said control means further comprising means for initializing said stabilizing means and said comparing means during inactive periods of said switching devices.

5. A DC to DC converter in accordance with claim 1 wherein said comparing means comprises:

a first transistor having base, emitter, and collector terminals and having its collector terminal coupled to an auxiliary source of DC potential and its base terminal coupled to said error signal generating means for receiving said error signals;

a second transistor having base, emitter, and collector terminals and having its base terminal connected to a biasing network and its emitter terminal connected to the secondary winding of said current monitoring transformer which in turn is connected to said source of DC potential; and a resistor connected between the emitter of said first transistor and the collector of said second transistor.

6. A DC to DC converter in accordance with claim 1 wherein said control means comprises:

a toggle flip-flop having a toggle input terminal connected to said pulse generating means and responsive to said periodic pulses, and having a normal output terminal and an inverted output terminal;

a set/reset flip-flop having a set input terminal connected to said pulse generating means and responsive to said periodic pulses, a reset input terminal connected to said comparing means and responsive to said pulse termination signals and having a normal output terminal;

a first NAND gate having its output coupled to one of said switching devices, and second NAND gate having its output coupled to the other one of said switching devices;

a third NAND gate having its output coupled to said comparing means;

first means for connecting the normal output terminal of said toggle flip-flop to a first input of said first NAND gate;

second means for connecting the inverted output terminal of said toggle flip-flop to a first input of said second NAND gate;

third means for connecting the normal output terminal of said set/reset flip-flop to a second input of said first NAND gate, to a second input of said second NAND gate, and to a first input of said third NAND gate;

fourth means for connecting said pulse generating means to a second input of said third NAND gate; and delay means for connecting said pulse generating means to a third input of said first NAND gate and to a third input of said second NAND gate.

7. A DC to DC converter in accordance with claim 1 and further comprising means connected to said inverter circuit and said source of DC potential for suppressing noise generated by said inverter circuit.

8. A DC to DC converter in accordance with claim 7 wherein said noise suppressing means comprises:

a first series combination of a first resistor and a first capacitor connected between one end of the primary winding of said inverter transformer and said source of DC potential;

a second series combination of a second resistor and a second capacitor connected between the other end of the primary winding of said inverter transformer and said source of DC potential; and a series combination of a third resistor and a primary winding of a noise elimination transformer connected between the junction of said first resistor and said first capacitor and the junction of said second resistor and said second capacitor, said noise elimination transformer further comprising a center tapped secondary winding having the center tap connected to one end of the secondary winding of said current monitoring transformer and the ends of said secondary winding of said noise elimination transformer connected to the other end of the secondary winding of said current monitoring transformer through individual diode devices poled to conduct current from the center tap of the secondary winding of said noise elimination transformer toward the junction of said diode devices and the secondary winding of said current monitoring transformer.

9. A DC to DC converter in accordance with claim 1 wherein said pulse generating means comprises:
- a first series combination of a first resistor, a second resistor, and a third resistor connected across an auxiliary source of DC potential to form a voltage divider;
- a second series combination of a fourth resistor and first capacitor connected across said auxiliary source of DC potential;
- a first comparator circuit having a reference input connected to the junction between said first resistor and said second resistor and having a second input connected to the junction between said fourth resistor and said first capacitor;
- a second comparator having a reference input connected to the junction between said second resistor and said third resistor and having a second input connected to the junction between said fourth resistor and said first capacitor;
- a set/reset flip-flop having a normal output;
- gating circuitry connected between said first and second comparator and said set/reset flip-flop to set said set/reset flip-flop when the voltage on said first capacitor is below the voltage on the reference input to both comparators and to clear said flip-flop when the voltage on said first capacitor is greater than the voltage on the reference input to both comparators;
- a transistor having base, collector, and emitter terminals and having its base terminal connected to said true output of said set/reset flip-flop and its emitter connected to said DC source of potential; and
- a fifth resistor connected between the junction of said fourth resistor and said first capacitor and the collector terminal of said transistor.

10. A DC to DC converter in accordance with claim 9 further comprising start control means for controlling said pulse generating means such that the first inverter current pulse upon startup of the converter is limited to one-half of the normal maximum pulse width, said start control means comprising:
- a second capacitor connected between the junction of said first resistor and said second resistor and said auxiliary source of DC potential;
- a control transistor having base, collector, and emitter terminals, said collector and emitter terminals connected across said second capacitor; and
- means for selectively activating said control transistor.

11. A DC to DC converter comprising:
- an inverter circuit comprising two circuit loops connected to a source of DC potential, each circuit loop comprising a switching transistor and one-half of a center tapped primary winding of an inverter transformer having the center tap thereof connected to said source of DC potential, both circuit loops being completed by connecting the transistors to said source of DC potential through a common path;
- an output circuit comprising a rectifier circuit and a filter circuit connected to a center tapped secondary winding of said inverter transformer such that a DC output voltage is derived;
- a comparator circuit having a first input connected to said DC output voltage and a second input connected to a reference voltage and an output for providing error signals indicative of differences between the DC output voltage and the reference voltage;
- a pulse generating circuit for generating a sequence of periodic pulses;
- said common path comprising a primary winding of a current monitoring transformer, said current monitoring transformer generating in a secondary winding thereof current signals directly proportional to current flowing in the primary of said inverter transformer;
- a comparing circuit for directly comparing said current signals to current threshold levels representative of said error signals and for generating pulse termination signals, said comparing circuit comprising: a resistance element; a voltage amplifier coupled to said comparator output for receiving said error signals and to said resistance element for maintaining the voltage on one side of said resistance element at a voltage substantially equal to said error signals; and a current source coupled to said current monitoring transformer and to the other side of said resistance element for maintaining the current through said resistance element at a level substantially equal to said current signals; and
- a control circuit connected to said pulse generating circuit, to said comparing circuit, and to said inverter circuit for controlling said transistors such that said transistors are alternately activated by consecutive pulses from said pulse generating circuit and deactivated by said pulse termination signals for causing pulses of current to flow in the primary winding of said inverter transformer.

12. In a DC to DC switching converter comprising an inverter circuit having a transformer and two switching devices which are alternately activated and deactivated, an output circuit connected to said inverter circuit, a pulse generating circuit, and a control circuit connected to said pulse generating circuit and said inverter circuit for alternately activating said switching devices in response to signals from said pulse generating circuit and for deactivating an active switching device in response to current feedback signals from said inverter circuit exceeding current threshold signals, the arrangement for controlling the startup of said DC to DC switching converter comprising:
start control means for controlling said pulse generating means such that the first pulse provided by pulse generating means upon startup is limited to one-half of the normal maximum pulse width.

* * * * *